United States Patent [19]

Kobayashi et al.

[11] Patent Number: 4,822,855

[45] Date of Patent: Apr. 18, 1989

[54] THERMOPLASTIC ELASTOMER COMPOSITIONS

[75] Inventors: Seizo Kobayashi; Katumi Usui; Takashi Mizoe; Noboru Yamaoka, all of Yokohama; Kazuo Matsuura, Tokyo, all of Japan

[73] Assignee: Nippon Oil Company, Limited, Tokyo, Japan

[21] Appl. No.: 81,464

[22] Filed: Aug. 4, 1987

[30] Foreign Application Priority Data

Aug. 5, 1986 [JP] Japan ............................... 61-182691

[51] Int. Cl.$^4$ ...................... C08L 23/28; C08L 23/16; C08L 23/18
[52] U.S. Cl. ................................... 525/194; 525/240; 525/211; 525/193
[58] Field of Search ................................ 525/240, 194

[56] References Cited

U.S. PATENT DOCUMENTS

| | | | |
|---|---|---|---|
| 4,088,714 | 5/1978 | Huff | 525/194 |
| 4,212,787 | 7/1980 | Matsuda et al. | 525/240 |
| 4,722,973 | 2/1988 | Yamaoka et al. | 525/194 |
| 4,732,940 | 3/1988 | Yamaoka et al. | 525/194 |
| 4,748,206 | 5/1988 | Nogiwa et al. | 525/240 |

FOREIGN PATENT DOCUMENTS 0164217 12/1985 European Pat. Off. .

*Primary Examiner*—Carman J. Seccuro
*Attorney, Agent, or Firm*—Dilworth & Barrese

[57] ABSTRACT

A thermoplastic elastomer composition prepared by partially crosslinking a composition comprising the following components (A), (B) and (C):

(A) 30–70 parts by weight of an ethylene/α-olefin copolymer prepared by copolymerizing ethylene and an α-olefin having 3 to 12 carbon atoms in the presence of a catalyst comprising a solid component and an organoaluminum compound which solid component contains at least magnesium and titanium, said ethylene/α-olefin copolymer having the following properties (I) to (IV):

| | | |
|---|---|---|
| (I) | Melt index | 0.01–100 g/10 min |
| (II) | Density | 0.860–0.910 g/cm$^3$ |
| (III) | Maximum peak temperature as measured according to a differential scanning calorimetry (DSC) | not lower than 100° C. |
| (IV) | Insolubles in boiling n-hexane | not less than 10 wt. % |

(B) 70–30 parts by weight of a propylene polymer; and
(C) 70–200 parts by weight, based on 100 parts by weight of the components (A) and (B), of an ethylene/α-olefin copolymer rubber.

6 Claims, No Drawings

THERMOPLASTIC ELASTOMER COMPOSITIONS

BACKGROUND OF THE INVENTION

The present invention relates to a novel thermoplastic elastomer composition comprising partially crosslinked hard and soft segments. More particularly, it is concerned with a thermoplastic elastomer composition obtained by partially crosslinking a composition of an extremely low density ethylene copolymer prepared by copolymerizing ethylene and an α-olefin in the presence of a specific catalyst, a propylene polymer and an ethylene/α-olefin copolymer rubber, the said thermoplastic elastomer composition being highly flexible, superior in fluidity and resistance to heat and oil, and being small in permanent set.

As thermoplastic polyolefin elastomers there are known compositions comprising crystalline polyolefins such as polyethylene and polypropylene as hard segments and amorphous copolymer rubbers such as ethylene/propylene copolymer rubber (EPR) and ethylene/propylene/non-conjugated diene copolymer rubber (EPDM) as soft segments, as well as compositions obtained by partially crosslinking the above compositions. It is also known to prepare hard and soft segments according to a multi-stage polymerization process. And by changing the proportions of those segments there are obtained various grades of products ranging from one superior in flexibility up to one having rigidity.

Products of the flexible grade are attracting great attention because they can be applied as rubbery materials widely to such uses as automobile parts, hoses, electric wire coating and packing. In preparing such flexible grade of products it is necessary to increase the proportion of a soft segment (e.g. EPR or EPDM) and decrease that of a hard segment (e.g. polyethylene or polypropylene) in order to impart rubbery flexibility thereto.

However, such soft segments as EPR and EPDM are poor in tensile strength and inferior in resistance to heat and oil and also inferior in fluidity. Consequently, flexible, thermoplastic elastomer compositions containing large amounts of such soft segments also have the above-mentioned drawback and cannot be applied to a wide variety of uses. Increasing the hard segment proportion to remedy these problems will result in loss of flexibility, deterioration of physical properties such as permanent set and consequent impairment of the function as a flexible, thermoplastic elastomer.

Moreover, in preparing a product of the flexible grade, it is necessary to carry out polymerizations separately for hard and soft segments, thus resulting in that not only the polymerization apparatus becomes very complicated in structure but also it is very difficult to control the properties and proportion of each segment in each polymerization stage and a defective product sometimes occurs at the time of changeover from one to another grade. Further, the recovery of the resulting polymer is also very difficult because a large amount of a rubbery component is contained therein.

Thus, a lot of problems remain to be solved in order to obtain a flexible, thermoplastic elastomer of good quality.

SUMMARY OF THE INVENTION

It is the object of the present invention to overcome the above-mentioned problems of the prior art and provide a process for preparing a highly flexible, thermoplastic elastomer composition having superior performance.

More specifically, the present invention resides in a thermoplastic elastomer composition obtained by partially crosslinking a composition comprising the following components (A), (B) and (C):

(A) 30–70 parts by weight of an ethylene/α-olefin copolymer prepared by copolymerizing ethylene and an α-olefin having 3 to 12 carbon atoms in the presence of a catalyst comprising a solid component and an organoaluminum compound which solid component contains at least magnesium and titanium, said ethylene/α-olefin copolymer having the following properties (I) to (IV):

| (I) Melt index | 0.01–100 g/10 min |
| --- | --- |
| (II) Density | 0.860–0.910 g/cm$^3$ |
| (III) Maximum peak temperature as measured according to a differential scanning calorimetry (DSC) | not lower than 100° C. |
| (IV) Insolubles in boiling n-hexane | not less than 10 wt. % |

(B) 70–30 parts by weight of a propylene polymer, and
(C) 70–200 parts by weight [based on 100 parts by weight of the components (A) and (B)] of an ethylene/α-olefin copolymer rubber.

DETAILED DESCRIPTION OF THE PREFERRED EMBODIMENTS

(1) Ethylene/α-Olefin Copolymer (A)

In the ethylene/α-olefin copolymer (A) used in the present invention, the α-olefin to be copolymerized with etyylene is one having 3 to 12 carbon atoms. Examples are propylene, butene-1, 4-methylpentene-1, hexene-1, octene-1, decene-1 and dodecene-1. Particularly preferred are propylene, butene-1, 4-methyl-pentene-1 and hexene-1 which having 3 to 6 carbon atoms. Further, dienes such as, for examples, butadiene and 1,4-hexadiene may be used as comonomers. It is preferable that the α-olefin content in the ethylene/α-olefin copolymer be in the range of 5 to 40 mol %.

The following description is provided about how to prepare the ethylene/α-olefin copolymer (A) used in the present invention.

The catalyst system used comprises a solid catalyst component and an organoaluminum compound, the solid catalyst component containing at least magnesium and titanium. For example, the solid catalyst component is obtained by supporting a titanium compound on an inorganic solid compound containing magnesium by a known method. Examples of magnesium-containing inorganic solid compounds include, in addition to metal magnesium, magnesium hydroxide, magnesium carbonate, magnesium oxide, magnesium chloride, as well as double salts, double oxides, carbonates, chlorides and hydroxides, which contain magnesium atom and a metal selected from silicon, aluminum and calcium, further, these inorganic solid compounds after treatment or reaction with oxygen-containing compounds, sulfur-containing compounds, aromatic hydrocarbons or halogen-containing substances.

As examples of the above oxygen-containing compounds are mentioned organic oxygen-containing compounds such as water, alcohols, phenols, ketones, aldehydes, carboxylic acids, esters, polysiloxanes and acid amides, as well as inorganic oxygen-containing compounds such as metal alkoxides and metal oxychlorides. As examples of the above sulfur-containing compounds such as thiols, thio-ethers and the like, inorganic sulfur-containing compounds such as sulfur dioxide, sulfur trioxide, sulfuric acid and the like. As examples of the above aromatic hydrocarbons are mentioned mono- and polycyclic aromatic hydrocarbons such as benzene, toluene, xylene, anthracene and phenanthrene. As examples of the above halogen-containing compounds are mentioned chlorine, hydrogen chloride, metal chlorides and organic halides.

To illustrate the titanium compound, mention may be made of halides, alkoxyhalides, alkoxides and halogenated oxides, of titanium. Tetravalent and trivalent titanium compounds are preferred. As tetravalent titanium compounds are preferred those represented by the general formula $Ti(OR)_nX_{4-n}$ wherein R is an alkyl, aryl or aralkyl group having 1 to 20 carbon atoms, X is a halogen atom and n is $0 \leq n \leq 4$, such as, for example, titanium tetrachloride, titanium tetrabromide, titanium tetraiodide, monomethoxytrichlorotitanium, dimethoxydichlorotitanium, trimethoxymonochlorotitanium, tetramethoxytitanium, monoethoxytrichlorotitanium, diethoxydichlorotitanium, triethoxymonochlorotitanium, tetraethoxytitanium, monoisopropoxytrichlorotitanium, diisopropoxydichlorotitanium, triisopropoxymonochlorotitanium, tetraisopropoxytitanium, monobutoxytrichlorotitanium, dibutoxydichlorotitanium, monopentoxytrichlorotitanium, monophenoxytrichlorotitanium, diphenoxydichlorotitanium, triphenoxymonochlorotitanium and tetraphenoxytitanium. As examples of trivalent titanium compounds are mentioned titanium trihalides such as titanium tetrachloride and titanium tetrabromide with hydrogen, aluminum, titanium or an organometallic compound of a Group I-III metal in the Periodic Table, as well as trivalent titanium compounds obtained by reducing tetravalent alkoxytitanium halides of the general formula $Ti(OR)_mX_{4-m}$ with an organometallic compound of a Group I-III metal in the Periodic Table in which formula R is an alkyl, aryl or aralkyl group having 1 to 20 carbon atoms, X is a halogen atom and m is $0 \leq m \leq 4$. Tetravalent titanium compounds are particularly preferred.

As preferred examples of catalyst systems are mentioned combinations of organoaluminum compounds with such solid catalyst components as MgO-RX-TiCl$_4$ (Japanese Patent Publication No.3514-1976), Mg-SiCl$_4$-ROH-TiCl$_4$ (Japanese Patent Publication No. 23864/1975), MgCl$_2$-Al(OR)$_3$-TiCl$_4$ (Japanese Patent Publication Nos.152/1976 and 15111/1977), MgCl$_2$-SiCl$_4$-ROH-TiCl$_4$ (Japanese Patent Laid Open No. 106581/1974), Mg(OOCR)$_2$-Al(OR)$_3$-TiCl$_4$ (Japanese Patent Publication No.11710/1977), Mg-POCl$_3$-TiCl$_4$ (Japanese Patent Publication No.153/1976), MgCl$_2$-AlOCl-TiCl$_4$ (Japanese Patent Publication No.15316/1979) and MgCl$_2$-Al(OR)$_n$X$_{3-n}$-Si(OR')$_m$X$_{4-m}$-TiCl$_4$ (Japanese Patent Laid Open No.95909/1981), in which formulae R and R' are each an organic radical and X is a halogen atom.

As other examples of catalyst systems are mentioned combinations of organoaluminum compounds with reaction products as solid catalyst components obtained by the reaction of organomagnesium compounds such as so-called Grignard compounds with titanium compounds. Examples of organomagnesium compounds are those of the general formulae RMgX, R$_2$Mg and RMg(OR) wherein R is an organic radical having 1 to 20 carbon atoms and X is a halogen atom, and ether complexes thereof, as well as modified compounds obtained by modifying these organomagnesium compounds with other organometallic compounds such as, for example, organosodium, organolithium, organopotassium, organoboron, organocalcium and organozinc.

More concrete examples of such catalyst systems are combinations of organoaluminum compounds with such solid catalyst components as RMgX—TiCl$_4$ (Japanese Patent Publication No.39470/1975), RMgX—phenol-TiCl$_4$ (Japanese Patent Publication No.12953/1979), RMgX—halogenated phenol-TiCl$_4$ (Japanesse Patent Publication No.12954/1979) and RMgX-CO$_2$-TiCl$_4$ (Japanese Patent Laid Open No.73009/1982).

As still other examples of catalyst systems are mentioned combinations of organoaluminum compounds with solid products obtained by contacting such inorganic oxides as SiO$_2$ and Al$_2$O$_3$ with the solid catalyst component containing at least magnesium and titanium. In addition to SiO$_2$ and Al$_2$O$_3$ there also may be mentioned CaO, B$_2$O$_3$ and SnO$_2$ as examples of inorganic oxides. Double oxides thereof are also employable without any trouble. For contacting these inorganic oxides with the solid catalyst component containing magnesium and titanium, there may be adopted a known method. For example, both may be reacted at a temperature of 20° to 400° C., preferably 50° to 300° C., usually for 5 minutes to 20 hours, in the presence or absence of an inert solvent, or both may be subjected to a co-pulverization treatment, or there may be adopted a suitable combination of these methods.

As more concrete examples of such catalyst systems, mention may be made of combination of organoaluminum compounds with SiO$_2$—ROH—MgCl$_2$—TiCl$_4$ (Japanese Patent Laid Open No.47407/1981), SiO$_2$—R—O—R'—MgO—AlCl$_3$—TiCl$_4$ (Japanese Patent Laid Open No.187305/1982) and SiO$_2$—MgCl$_2$—Al(OR)$_3$—TiCl$_4$—Si(OR')$_4$ (Japanese Patent Laid Open No.21405/1983) in which formulae R and R' are each a hydrocarbon radical.

In these catalyst systems the titanium compounds may be used as adducts with organocarboxylic acid esters, and the magnesium-containing inorganic solid compounds may be used after contact treatment with organic carboxylic acid esters. Moreover, the organoaluminum compounds may be used as adducts with organocarboxylic acid esters. Further, the catalyst systems may be prepared in the presence of organic carboxylic acid esters.

As organic carboxylic acid esters there may be used various aliphatic, alicyclic and aromatic carboxylic acid esters, preferably aromatic carboxylic acid esters having 7 to 12 carbon atoms. Examples are alkyl esters such as methyl and ethyl of benzoic, anisic and toluic acids.

As preferred examples of the organoaluminum compound to be combined with the solid catalyst component are mentioned those represented by the general formulae R$_3$Al, R$_2$AlX, RAlX$_2$, R$_2$AlOR, RAl(OR)X and $R_3Al_2X_3$ wherein Rs, which may the same or different, are each an alkyl, aryl or aralkyl group having 1 to 20 carbon atoms, such as triethylaluminum, triisobutylaluminum, trihexylaluminum, trioctylaluminum, diethylaluminum chloride, diethylaluminum ethoxide, ethylaluminum sesquichloride, and mixtures thereof.

The amount of the organoaluminum compound used is not specially limited, but usually it is in the range of 0.1 to 1,000 mols per mol of the titanium compound.

The catalyst system exemplified above may be contacted with an α-olefin before its used in the polymerization reaction. By so doing, its polymerization activity can be greatly improved and a stabler operation is ensured as compared with the case where it is not so treated. In this case, various α-olefins are employable, but preferably those having 3 to 12 carbon atoms and more preferably those having 3 to 8 carbon atoms. Examples are propylene, butene-1, pentene-1, 4-methylpentene-1, hexene-1, octene-1, decene-1, dodecene-1, and mixtures thereof. The temperature and time of the contact between the catalyst system and α-olefin can be selected over a wide range, for example, 0°–200° C., preferably 0°–110° C., and 1 minute to 24 hours. The amount of the α-olefin to be contacted with the catalyst system can also be selected over a wide range, but usually it is desirable that the catalyst system be treated with 1 g to 50,000 g, preferably 5 g to 30,000 g, per gram of the solid catalyst component of the α-olefin and reacted with 1 g to 500 g per gram of the solid catalyst component of the α-olefin. The pressure in the contact treatment is not specially limited, but preferably it is in the range of $-1$ to 100 kg/cm$^2$.G.

In the α-olefin treatment, the catalyst system may be contacted with the α-olefin after combining the total amount of the organoaluminum compound used with the solid catalyst component, or the catalyst system may be contacted with the α-olefin after combining a part of the organoaluminum compound used with the solid catalyst component and the remaining portion of the organoaluminum compound may be added separately in the polymerization reaction. The contact treatment of the catalyst system with the α-olefin may be conducted in the presence of hydrogen gas or any other inert gas, e.g. nitrogen, argon or helium.

The polymerization reaction is carried out in the same manner as in the conventional olefin polymerization reaction using a Ziegler type catalyst. More particularly, the reaction is performed in a substantially oxygen- and water-free condition in vapor phase or in the presence of an inert solvent or using monomer per se as solvent. Olefin polymerizing conditions involve temperatures in the range of 20° to 300° C., preferably 40° to 200° C., and pressures in the range from normal pressure to 70 kg/cm$^2$.G, preferably 2 kg/cm$^2$.G or 60 kg/cm$^2$.G. The molecular weight can be adjusted to some extent by changing polymerization conditions such as polymerization temperature and catalyst mol ratio, but the addition of hydrogen into the polymerization system is more effective for this purpose. Of course, two or more multi-stage polymerization reactions involving different polymerization conditions such as different hydrogen concentrations and different polymerization temperatures can be carried out without any trouble.

The melt index (MI, according to JIS K 6760) of the ethylene/α-olefin copolymer (A) thus prepared is in the range of 0.01 to 100 g/10 min, preferably 0.1 to 50 g/10 min. Its density (according to JIS K 6760) is in the range of 0.860 to 0.910 g/cm$^3$, preferably 0.870 to 0.905 g/cm$^3$ and more preferably 0.870 to 0.900 g/cm$^3$. Its maximum peak temperature (Tm) measured according to a differential scanning calorimetry (DSC) is not lower than 100° C., preferably not lower than 110° C. Its insolubles in boiling n-hexane are not less than 10 wt. %, preferably 20–95 wt. % and more preferably 20–90 wt. %.

If the melt index of the ethylene/α-olefin copolymer (A) is less than 0.01 g/10 min, the melt index of the thermoplastic elastomer composition will become too low, resulting in deterioration of its fluidity. And if it exceeds 100 g/10 min, the tensile strength will be reduced. A density thereof lower than 0.860 g/cm$^3$ would result in lowering of tensile strength, surface stickiness of the composition and impairment of the appearance. A density of the copolymer exceeding 0.910 g/cm$^3$ is not desirable, because it would cause deterioration of flexibility and transparency. A maximum peak temperature thereof as measured according to DSC of lower than 100° C. is not desirable, either, because it would result in lowering of tensile strength, surface stickiness of the composition and reduced resistance to heat and oil. If the proportion of insolubles in boiling n-hexane is smaller than 10 wt. %, the resulting composition will be reduced in tensile strength and become sticky on its surface, and thus such a proportion is undesirable.

(2) Propylene Polymer (B)

As examples of the propylene polymer (B) used in the present invention there are mentioned not only a homopolymer of propylene but also block and random copolymers of propylene and other comonomers. Preferred as the comonomers are α-olefins having 2 to 8 carbon atoms such as, for example, ethylene, butene-1, hexene-1, 4-methylpentene-1, and octene-1. Preferably, these comonomers are present in proportions not larger than 30 mol % in the copolymers.

The melt flow rate (MFR, according to JIS K 6758) of the propylene polymer is in the range of 0.1 to 50 g/10 min, preferably 0.5 to 20 g/10 min. If MFR is smaller than 0.1 g/10 min, it will be impossible to obtain a resin composition having good fluidity, and if MFR exceeds 50 g/10 min, it will result in reduced tensile strength and impact strength.

(3) Ethylene/α-Olefin Copolymer Rubber (C)

The ethylene/α-olefin copolymer rubber (C), which is still another component used in the present invention, is an ethylene/α-olefin copolymer rubber or an ethylene/α-olefin/non-conjugated diene copolymer rubber. These are amorphous copolymer.

In the ethylene/α-olefin copolymer rubber (C), examples of the α-olefin are propylene, butene-1, pentene-1, 4-methylpentene-1, hexene-1 and octene-1, with propylene being particularly preferred.

Examples of the non-conjugated diene are 1,4-hexadiene, 1,6-octadiene, dicyclopentadiene, vinyl norbornene and ethylidene norbornene, with 1,4-hexadiene and ethylidene norbornene being preferred.

The ethylene/α-olefin copolymer rubber used in the invention has a Mooney viscosity (ML$_{1+4}$, 100° C.) of 10 to 95. A Mooney viscosity thereof lower than 10 is not desirable because it would result in reduced tensile strength or sticky surface of the thermoplastic elastomer compostion. A Mooney viscosity of the copolymer rubber exceeding 95 is also undesirable because it will lead to deterioration in flowing property of the thermoplastic elastomer composition.

The ethylene/α-olefin copolymer (A) and the ethylene/α-olefin copolymer rubber (C), which are components of the thermoplastic elastomer composition of the present invention, are easily distinguishable from each other. Even if both are the same in point of the constituent monomers and density, the maximum peak temperature (Tm) is much higher in the component (A), while in the case of component (C), even if there is a maximum peak temperature (Tm) thereof, it is in the range of 30° to 50° C. at most. Also as to insolubles in boiling n-hexane, the component (C) does not contain such insolubles, or even if it contains such insolubles, the amount thereof is extremely small. The two components are also greatly, different in point of how to prepare them. The component (A) is prepared using a catalyst which contains magnesium and titanium as previously noted, while the component (C) is usually prepared using a vanadium catalyst.

(4) Composition Ratio (Mixing Ratio)

The composition ratios of the ethylene/α-olefin copolymer (A) [hereinafter referred to as component (A)], the propylene polymer (B) [hereinafter referred to as component (B)] and the ethylene/α-olefin copolymer rubber (C) [hereinafter referred to as component (C)] in the thermoplastic elastomer composition of the present invention are 30–70 parts, preferably 40–60 parts, by weight of component (A), 70–30 parts, preferably 60–40 parts, by weight of component (B), and 70–200 parts, preferably 100–150 parts, by weight based on 100 parts by weight of components (A) and (B), of component (C).

If the proportion of component (A) exceeds 70 parts by weight, the heat resistance and fluidity will be deteriorated, and if it is smaller than 30 parts by weight, deficiency will result in point of flexibility. Thus, both such values are undesirable. A proportion of component (B) exceeding 70 parts by weight will bring about improvement of heat resistance, but result in poor flexibility, and if the proportion thereof is smaller than 30 parts by weight, the heat resistance of the composition will be deteriorated.

Further, if the proportion of component (C) is smaller than 70 parts by weight based on 100 parts by weight of components (A) and (B), deficiency will result in point of flexibility, and a proportion thereof exceeding 200 parts by weight will result in lowering of heat resistance and strength.

(5) Preparation of the Thermoplastic Elastomer Composition

For preparing the thermoplastic elastomer composition of the present invention, the components (A), (B) and (C) may be mixed together in predetermined proportions followed by partial crosslinking. But, preferably, the components (B) and (C) are first mixed together and partially crosslinked, thereafter the component (A) is incorporated in the mixture.

The partial crosslinking may be effected by any known method. A typical example is a mechanical melt-kneading method which is carried out under the addition of a crosslinking agent to the above mixture. According to this known method, the partial crosslinking can be effected using any of uni- and biaxial extruders, Bumbury's mixer, various kneaders and rolls. The melt-kneading temperature is generally not higher than 300° C. and preferably it is a temperature at which the half-value period of the crosslinking agent used is not longer than one minute, usually in the range of 100° to 300° C. The partial crosslinking may be performed using heat or radiation after incorporating the crosslinking agent in the mixture by impregnation or any other suitable means.

As the crosslinking agent, an organic peroxide is usually employed. Examples are 2,5-dimethyl-2,5-di(t-butylperoxy)hexane, di-t-butyl peroxide, di(t-butylperoxy)diisopropylbenzene, di(t-butylperoxy)-diisobutylbenzene, dicumyl peroxide, t-butylcumyl peroxide, t-butylperoxy benzoate, 1,1-bis(t-butylperoxy)-3,3,5-trimethyl peroxide, benzoyl peroxide, and p-chlorobenzoyl peroxide.

There may be used a crosslinking aid together with the crosslinking agent. Examples are liquid polybutadiene, divnylbenzene, ethylene dimethacrylate, and diallyl phthalate.

The amount of the crosslinking agent used is in the range of 0.005 to 3 wt. %, preferably 0.05 to 1.0 wt. %, provided this range does not always constitute a limitation because the amount of the crosslinking agent to be used is determined according to the performance required for the crosslinked composition. Several kinds of crosslinking agents and crosslinking aids may be used together according to purposes.

The percent insolubles in boiling xylene (gel percentage) which is determined after extracting the thermoplastic elastomer composition of the present invention thus obtained by partial crosslinking, with boiling xylene for 5 hours, is in the range of 0.5 to 60 wt. %, preferably 2 to 50 wt. %. If the gel percentage is smaller than 0.5 wt. %, the heat resistance and the oil resistance will become poor, and a gel percentage exceeding 60 wt. % will result in reduced fluidity and elongation.

Before or after crosslinking, or during crosslinking (particularly during melt-kneading), there may be added, if necessary, fillers such as carbon black, calcium carbonate, silica, metallic fibers and carbon fibers, as well as additives such as antioxidant, flame retardant and coloring agent, and paraffinic, naphthenic or aromatic mineral oils for assisting the dispersion of the fillers and enhancing flexibility and elasticity.

Further, various kinds of resins and rubbers may be added, if necessary, in amounts not causing a change in performance of the thermoplastic elastomer composition of the present invention; for example, crystalline polyolefins such as high and low density polyethylenes and linear low density polyethylenes, natural and synthetic rubbers, and styrene-based thermoplastic elastomers.

The thermoplastic elastomer composition of the present invention has the following characteristics.

(a) Superior in fluidity, so easy to mold, giving molded products having good appearance.

(b) Superior in heat and oil resistance.

(c) Small permanent elongation makes deformation difficult.

(d) Superior in flexibility.

(e) Low density and very light weight.

Since the thermoplastic elastomer composition of the present invention has such excellent characteristics, its application range is extremely wide. The following are application examples thereof:

(a) automobile interior sheet, mud guard, lace and cover (b) electric wire coating material (c) components of various electric appliances
(d) hose
(e) various packings
(f) window frame sealing material
(g) sound insulating material
(h) modifier for various polymers The following examples are given to further illustrate the present invention, but the invention is not limited thereto. In the following working examples and comparative examples, physical properties were measured in the following manner.

[Measurement by DSC]

A hot-pressed 100 μm thick film as a specimen is heated to 170° C. and held at this temperature for 15 minutes, followed by cooling to 0° C. at a rate of 2.5° C./min. Then, from this state the temperature is raised to 170° C. at a rate of 10° C./min and measurement is made. The vertex position of the maximum peak of peaks appearing during the heat-up period from 0° to 170° C. is regarded as the maximum peak temperature (Tm).

[How to Determine Insolubles in Boiling n-Hexane]

A 200 μm thick sheet is formed using a hot press, from which are then cut out three sheets each 20 mm long by 30 mm wide. Using these sheets, extraction is made in boiling n-hexane for 5 hours by means of a double-tube type Soxhlet extractor. n-Hexane insolubles are taken out and vacuum-dried (50° C., 7 hours), then the percentage insolubles ($C_6$ insoluble) in boiling n-hexane is calculated in accordance with the following equation:

$$\text{Insolubles in boiling n-hexane (wt. \%)} = \frac{\text{Weight of extracted sheet}}{\text{Weight of unextracted sheet}} \times 100 \text{ (wt. \%)}$$

[Preparing Test Sheet]

Each resin composition obtained is placed in a mold 2 mm thick, 150 mm long and 150 mm wide, preheated at 210° C. for 5 minutes, then pressure-molded for 5 minutes at the same temperature and at 150 kg/cm², and thereafter cooled for 10 minutes at 30° C. under the pressure of 150 kg/cm², followed by annealing at 50° C. for 20 hours and allowing to stand at room temperature for 24 hours. Thereafter, physical properties are measured.

Flow Parameter: FP]

$$FP = \frac{\text{Melt flow rate at 230° C., 21.6 kg load}}{\text{Melt flow rate at 230° C., 2.16 kg load}}$$

The larger the value of FP, the better the flowing property.

[Tensile Test]

Test piece is prepared using No.3 dumbbell in accordance with JIS K 6301 and it is measured for tensile strength at a pulling rate of 50 mm/min.

[Permanent Elongation]

Test piece is prepared using No. dumbbell in accordance with JIS K 6301. It is held at 100% elongated state for 10 minutes, then contracted suddenly and allowed to stand for 10 minutes to check percentage elongation, from which is determined a elongation.

[Softening Point]A 3 mm thick specimen is prepared in accordance with the test sheet preparing method and it is used for measurement A heat transfer medium is heated at a rate of 50° C./min while applying a load of 250 g through a needle-like indenter placed perpendicularly to the specimen in a heating bath, and the temperature of the heat transfer medium at the time when the needle-like indenter permeated 1 mm is regarded as a Vicat softening point.

[Hardness]

Test piece is prepared in accordance with JIS K 6301 and measured for hardness using type A and type C testing machines.

[Gel Percentage]

A 200 μm thick sheet is prepared using a hot press (at 200° C. for 5 minutes), from which three 40 mm×20 mm sheets are cut out. The three sheets are each placed in a 120-mesh wire gauze bag and extracted in boiling xylene for 5 hours using a double-tube type Soxhlet extractor. Boiling xylene insolubles are taken out and vacuum-dried (80° C., 7 hours) to determine the percentage thereof as a gel percentage.

EXAMPLE 1

As ethylene/butene-1 copolymer was prepared by copolymerizing ethylene and butene-1 in the presence of a catalyst comprising a solid catalyst component and triethylaluminum, the solid catalyst component having been obtained from a substantially anhydrous magnesium chloride, 1,2-dichloroethane and titanium tetrachloride.

The ethylene/butene-1 copolymer thus obtained was found to have an ethylene content of 88.3 mol %, a melt index of 0.9 g/10 min, a density of 0.896 g/cm³, a maximum peak temperature according to DSC of 119.8° C. and a boiling n-hexane insolubles content of 82 wt. %.

Separately, ethylene, propylene and ethylidene norbornene (ENB) were copolymerized using a vanadyl trichloride-ethylaluminum sesquichloride catalyst to obtain a copolymer rubber. This copolymer rubber was found to have a Mooney viscosity ($ML_{1+4}$, 100° C.) of 90, a propylene content of 27 wt. %, a density of 0.863 g/cm³ and an ENB content of 16 in terms of iodine value.

50 parts by weight of a propylene-ethylene random copolymer (ethylene content: 5.9 mol %) having a melt flow rate of 7 g/10 min, 100 parts by weight of the ethylene-propylene-ENB copolymer rubber, 0.5 wt. % of di(t-butylperoxy)dipropylbenzene (crosslinking agent), 0.1 wt. % of Irganox 1010 (antioxidant, a product of Ciba Geigy AG) and 0.15 wt. % of calcium stearate (lubricant)(each weight percent is based on 100 parts by weight of all the polymers in the final crosslinked composition) were dry-blended and then introduced into a Bumbury's mixer preheated to 200° C., in which kneading was performed for 10 minutes at 40 rpm. Then, 50 parts by weight of the ethylene/butene-1 copolymer was added and kneading was performed again at 200° C. for 10 minutes to obtain a thermoplastic elastomer composition. This composition was measured for physical properties. The results of the measurement are as shown in Table 1.

EXAMPLES 2 AND 3

The procedure of Example 1 was repeated except that the proportion of the ethylene-propylene-ENB copolymer rubber was changed as shown in Table 1. The resultant composition was measured for physical properties, the results of which are as shown in Table 1.

EXAMPLE 4

The procedure of Example 1 was repeated except that the amount of the ethylene/butene-1 copolymer and that of the propylene-ethylene random copolymer were changed to 60 parts and 40 parts by weight, respectively. The resultant composition was measured for physical properties, the results of which are as shown in Table 1.

EXAMPLE 5

The procedure of Example 1 was repeated except that the amount of the ethylene/butene-1 copolymer and that of the propylene-ethylene random copolymer were changed to 40 parts and 60 parts by weight, respectively. The resultant composition was measured for physical properties, the results of which are as shown in Table 1.

EXAMPLE 6

The procedure of Example 1 was repeated except that a propylene-ethylene block copolymer (ethylene content: 5.3 mol %) having a melt flow rate of 8 g/10 min was used as the propylene polymer. The resultant composition was measured for physical properties, the results of which are as shown in Table 1.

EXAMPLE 7

The procedure of Example 1 was repeated except that a propylene homopolymer (melt flow rate: 1 g/10 min) was used as the propylene polymer. The resultant composition was measured for physical properties, the results of which are as set out in Table 1.

EXAMPLE 8

50 parts by weight of the ethylene/butene-1 copolymer used in Example 1, 50 parts by weight of the propylene-ethylene random copolymer used in Example 1, 100 parts by weight of a copolymer rubber having a Mooney viscosity of 45, and the same proportions as in Example 1 of the crosslinking agent, antioxidant and lubricant were dry-blended and kneaded in a Bumbury's mixer at 200° C. for 20 minutes to obtain a thermoplastic elastomer composition. The resultant composition was measured for physical properties, the results of which are as set out in Table 1.

EXAMPLE 9

An ethylene-propylene copolymer was prepared by copolymerizing ethylene and propylene in the presence of a catalyst comprising a solid catalyst component and triethylaluminum, the solid catalyst component having been obtained from a substantially anhydrous magnesium chloride, anthracene and titanium tetrachloride.

The ethylene-propylene copolymer thus obtained was found to have an ethylene content of 85.5 mol %, a melt index of 1.0 g/10 min, a density of 0.890 g/cm$^3$, a maximum peak temperature according to DSC of 121.6° C. and a boiling n-hexane insolubles content of 58 wt. %.

An elastomer composition was obtained in the same way as in Example 1 except that the ethylene-propylene copolymer prepared above was used in place of the ethylene/butene-1 copolymer. The results of measurement of its physical properties are as set out in Table 1.

COMPARATIVE EXAMPLE 1

The procedure of Example 1 was repeated except that the amount of the ethylene/butene-1 copolymer and that of the propylene-ethylene random copolymer were changed to 20 parts and 80 parts by weight, respectively. The resultant coposition was measured for physical properties, the results of which are as set out in Table 1.

COMPARATIVE EXAMPLE 2

The procedure of Example 1 was repeated except that the amount of the ethylene/butene-1 copolymer and that of the propylene-ethylene random copolymer were changed to 80 parts and 20 parts by weight, respectively. The resultant composition was measured for physical properties, the results of which are as set out in Table 1.

COMPARATIVE EXAMPLE 3

The procedure of Example 1 was repeated except that the amount of the ethylene-propylene-ENB copolymer rubber was changed to 30 parts by weight. Physical properties of the resultant composition were measured, the results of which are as set out in Table 1.

COMPARATIVE EXAMPLE 4

The procedure of Example 1 was repeated except that the amount of the ethylene-propylene-ENB copolymer rubber was changd to 300 parts by weight. Physical properties of the resultant composition were measured, the results of which are as set forth in Table 1.

COMPARATIVE EXAMPLE 5

The procedure of Example 1 was repeated except that the crosslinking agent was not added. Physical properties of the resultant composition were measured, the results of which are as set forth in Table 1.

COMPARATIVE EXAMPLE 6

The procedure of Example 1 was repeated except that the ethylene/butene-1 copolymer was replaced by a straight-chain, low density polyethylene (LINIREX AF 2320, a product of Nippon Petrochemicals Co., Ltd., melt index 1.0 g/10 min, density 0.922 g/cm$^3$, DSC maximum peak temperature 122.1° C., boiling n-hexane insolubles content 98.8 wt. %). Physical properties of the resultant composition were measured, the results of which are as set forth in Table 1.

TABLE 1

| | Ethylene/α-Olefin Copolymer (A) | | | | Propylene Polymer (B) | | | Copolymer Rubber (C) |
|---|---|---|---|---|---|---|---|---|
| Monomer*1 | Melt Index (g/10 min) | Density (g/cm$^3$) | Tm (°C.) | Boiling n-Hexane Insolubles (wt. %) | Type of Copolymerization | MFR (g/10 min) | Comononer Content (mol %) | Mooney Viscosity ML$_{1+4}$, 100° C. |

TABLE 1-continued

| | | | | | | | | | | |
|---|---|---|---|---|---|---|---|---|---|---|
| Example 1 | C'$_2$-C'$_4$ | 0.9 | 0.896 | 119.8 | 82 | Random | 7 | Ethylene 5.9 | 90 |
| Example 2 | " | " | " | " | " | " | " | " | " |
| Example 3 | " | " | " | " | " | " | " | " | " |
| Example 4 | " | " | " | " | " | " | " | " | " |
| Example 5 | " | " | " | " | " | " | " | " | " |
| Example 6 | " | " | " | " | " | Block | 8 | Ethylene 5.3 | " |
| Example 7 | " | " | " | " | " | Homo | 1 | — | " |
| Example 8 | " | " | " | " | " | Random | 7 | Ethylene 5.9 | 45 |
| Example 9 | C'$_2$-C'$_3$ | 1.0 | 0.890 | 121.6 | 58 | " | " | " | 90 |
| Comparative Example 1 | C'$_2$-C'$_4$ | 0.9 | 0.896 | 119.8 | 82 | " | " | " | " |
| Comparative Example 2 | " | " | " | " | " | " | " | " | " |
| Comparative Example 3 | " | " | " | " | " | " | " | " | " |
| Comparative Example 4 | " | " | " | " | " | " | " | " | " |
| Comparative Example 5 | " | " | " | " | " | " | " | " | " |
| Comparative Example 6 | LLDPE | 1.0 | 0.922 | 122.1 | 98.8 | " | " | " | " |

Thermoplastic Elastomer Compositions

| | Blending Ratio ((A)/(B)/(C)) (part by weight) | Melt Flow Rate 230° C., 2.16 kg (g/10 min) | Melt Flow Rate 230° C., 21.6 kg (g/10 min) | FP | Tensile Strength (kg/cm$^2$) | Tensile Elongation (%) | Permanent Elongation (%) | Vicat Softening Point (°C.) | Hardness JIS A/C | Gel Percentage (wt. %) |
|---|---|---|---|---|---|---|---|---|---|---|
| Example 1 | 50/50/100 | 0.10 | 88 | 880 | 132 | 570 | 18 | 116 | 88/55 | 39 |
| Example 2 | 50/50/80 | 0.13 | 97 | 750 | 151 | 610 | 20 | 119 | 90/58 | 42 |
| Example 3 | 50/50/150 | 0.05 | 47 | 940 | 76 | 400 | 13 | 108 | 82/47 | 50 |
| Example 4 | 60/40/100 | 0.16 | 61 | 380 | 102 | 490 | 15 | 117 | 86/48 | 41 |
| Example 5 | 40/60/100 | 0.25 | 103 | 410 | 138 | 540 | 20 | 121 | 90/57 | 38 |
| Example 6 | 50/50/100 | 0.20 | 94 | 470 | 130 | 580 | 18 | 118 | 90/56 | 40 |
| Example 7 | 50/50/100 | 0.20 | 128 | 640 | 122 | 530 | 21 | 135 | 91/59 | 48 |
| Example 8 | 50/50/100 | 0.04 | 43 | 1080 | 150 | 580 | 18 | 117 | 90/58 | 53 |
| Example 9 | 50/50/100 | 0.14 | 102 | 730 | 101 | 510 | 18 | 114 | 82/53 | 30 |
| Comparative Example 1 | 20/80/100 | 0.18 | 130 | 720 | 145 | 640 | 25 | 117 | >100/70 | 28 |
| Comparative Example 2 | 80/20/100 | 0.02 | 18 | 900 | 80 | 740 | 15 | 77 | 79/37 | 26 |
| Comparative Example 3 | 50/50/30 | 0.08 | 101 | 1260 | 180 | 550 | 35 | 105 | >100/83 | 10 |
| Comparative Example 4 | 50/50/300 | 0.01 or less | 9 | — | 34 | 320 | 10 | 64 | 58/28 | 51 |
| Comparative Example 5 | 50/50/100 | 0.8 | 146 | 180 | 118 | 770 | 19 | 68 | 84/52 | 0 |
| Comparative Example 6 | 50/50/100 | 0.20 | 80 | 400 | 115 | 800 | 20 | 104 | 95/60 | 28 |

*1 C'$_2$: ethylene,
C'$_3$: propylene,
C'$_4$: butene-1,
LLDPE: linear low density polyethylene

What is claimed is:

1. A thermoplastic elastomer composition prepared by partially crosslinking a composition comprising the following components (A), (B) and (C):

(A) 30-70 parts by weight of an ethylene/α-olefin copolymer prepared by copolymerizing ethylene and an α-olefin having 3 to 12 carbon atoms in the presence of a catalyst comprising a solid component and an organoaluminum compound which solid component contains at least magnesium and titanium, said ethylene/α-olefin copolymer having the following properties (I) to (IV):

| (I) Melt index | 0.01-100 g/10 min |
|---|---|
| (II) Density | 0.870-0.905 g/cm$^3$ |
| (III) Maximum peak temperature as measured according to a differential scanning calorimetry (DSC) | not lower than 100° C. |
| (IV) Insolubles in boiling n-hexane | not less than 10 wt. % |

(B) 70-30 parts by weight of a propylene polymer; and (C) 70-200 parts by weight, based on 100 parts by weight of the components (A) and (B), of an ethylene/α-olefin copolymer rubber.

2. A composition as set forth in claim 1, wherein the α-olefin content of the ethylene/α-olefin copolymer (A) is in the range of 5 to 40 mol %.

3. A composition as set forth in claim 1, wherein the α-olefin of the ethylene/α-olefin copolymer (A) is propylene, butene-1, 4-methylpentene-1, hexene-1, octene-1, decene-1, or dodecene-1.

4. A composition as set forth in claim 1, wherein the propylene polymer (B) is a homopolymer of propylene or a copolymer of propylene and an α-olefin having 2 to 8 carbon atoms.

5. A composition as set forth in claim 1, wherein the ethylene/α-olefin copolymer rubber (C) has a Mooney viscosity (ML$_{1+4}$, 100° C.) in the range of 10 to 95.

6. A composition as set forth in claim 1, wherein the partial crosslinking is performed using an organic peroxide.

* * * * *

UNITED STATES PATENT AND TRADEMARK OFFICE
CERTIFICATE OF CORRECTION

PATENT NO. : 4,822,855

DATED : April 18, 1989

INVENTOR(S) : Kobayashi et al.

It is certified that error appears in the above-identified patent and that said Letters Patent is hereby corrected as shown below:

| | |
|---|---|
| Column 2, line 42 | "etyylene" should be --ethylene--; |
| Column 3, line 50 | "$0 \leq m \leq 4$" should be --$0 < m < 4$--; |
| Column 3, line 66 | "$X_{4-m}-TiCl4$" should be --$X_{4-m}-TiCl_4$--. |
| Column 8, line 18 | "divrylbenzene" should be --divinylbenzene--; |
| Column 9, line 51 | "Flow Parameter:FP]" should be --[Flow Parameter:FP]--; |
| Column 10, line 1 | "check percentage" should be --check a percentage--; |
| Column 10, line 2 | "determined a elongation" should be --determined a permanent elongation--; |
| Column 10, line 3 | [Softening Point] should be --[Vicat Softening Point]--; |

UNITED STATES PATENT AND TRADEMARK OFFICE
CERTIFICATE OF CORRECTION

PATENT NO. : 4,822,855

DATED : April 18, 1989

INVENTOR(S) : Kobayashi et al.

It is certified that error appears in the above-identified patent and that said Letters Patent is hereby corrected as shown below:

Column 12, line 41    "changd" should be --changed--.

Signed and Sealed this

Twenty-third Day of January, 1990

*Attest:*

JEFFREY M. SAMUELS

*Attesting Officer*    *Acting Commissioner of Patents and Trademarks*